United States Patent
Tsai et al.

(10) Patent No.: US 8,960,941 B2
(45) Date of Patent: Feb. 24, 2015

(54) ILLUMINATING MODULE FOR PORTABLE ELECTRONIC DEVICE

(71) Applicants: Cheng-Chieh Tsai, New Taipei (TW); Tzu-Cheng Yu, Santa Clara, CA (US); Jui-Hsiang Lin, New Taipei (TW); Ming-Shiung Chang, New Taipei (TW); Chun-Ta Huang, New Taipei (TW)

(72) Inventors: Cheng-Chieh Tsai, New Taipei (TW); Tzu-Cheng Yu, Santa Clara, CA (US); Jui-Hsiang Lin, New Taipei (TW); Ming-Shiung Chang, New Taipei (TW); Chun-Ta Huang, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 225 days.

(21) Appl. No.: 13/659,112

(22) Filed: Oct. 24, 2012

(65) Prior Publication Data

US 2013/0155650 A1    Jun. 20, 2013

(30) Foreign Application Priority Data

Dec. 20, 2011    (TW) .................................. 100223964

(51) Int. Cl.
*F21V 33/00*    (2006.01)
*H04M 1/22*    (2006.01)

(52) U.S. Cl.
CPC ............. *F21V 33/0052* (2013.01); *H04M 1/22* (2013.01)
USPC ......................... 362/109; 362/86; 362/311.02

(58) Field of Classification Search
None
See application file for complete search history.

(56) References Cited

U.S. PATENT DOCUMENTS

| | | | | |
|---|---|---|---|---|
| 5,845,038 | A * | 12/1998 | Lundin et al. .................. | 362/551 |
| 7,612,997 | B1 * | 11/2009 | Diebel et al. ............. | 361/679.56 |
| 8,860,581 | B2 * | 10/2014 | Small et al. .................... | 362/109 |
| 2003/0223250 | A1 * | 12/2003 | Ballen et al. .................. | 362/577 |

* cited by examiner

*Primary Examiner* — Britt D Hanley
(74) *Attorney, Agent, or Firm* — Novak Druce Connolly Bove + Quigg LLP

(57) ABSTRACT

A portable electronic device includes a body defining a receiving groove and an illuminating module. The illuminating module includes a light source mounted inside of the body, a control circuit connected to the light source and controlling the light source to irradiate light, and a light guiding strip received in the receiving groove and at least one end of the light guiding strip facing the light source. The light source irradiates light, and the light guiding strip receives and guides the irradiated light around the body.

19 Claims, 2 Drawing Sheets

ILLUMINATING MODULE FOR PORTABLE ELECTRONIC DEVICE

BACKGROUND

1. Technical Field

The disclosure generally relates to portable electronic devices, and particularly to an illuminating module used in the portable electronic device.

2. Description of the Related Art

Portable electronic devices are widely used in our daily life. To ensure the portable electronic device has a good lighting effect at night or in a dark environment, a surface of a housing of the portable electronic device is covered with a fluorescent layer, or a lighting transistor is secured within the portable electronic device. However, a light emitted by the fluorescent layer or the lighting transistor is uneven and has a low brightness, which will lead to a bad lighting effect.

Therefore, there is room for improvement within the art.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several diagrams. Wherever possible, the same reference numbers are used throughout the drawings to refer to the same or like elements of an embodiment.

DETAILED DESCRIPTION

Figure 1:
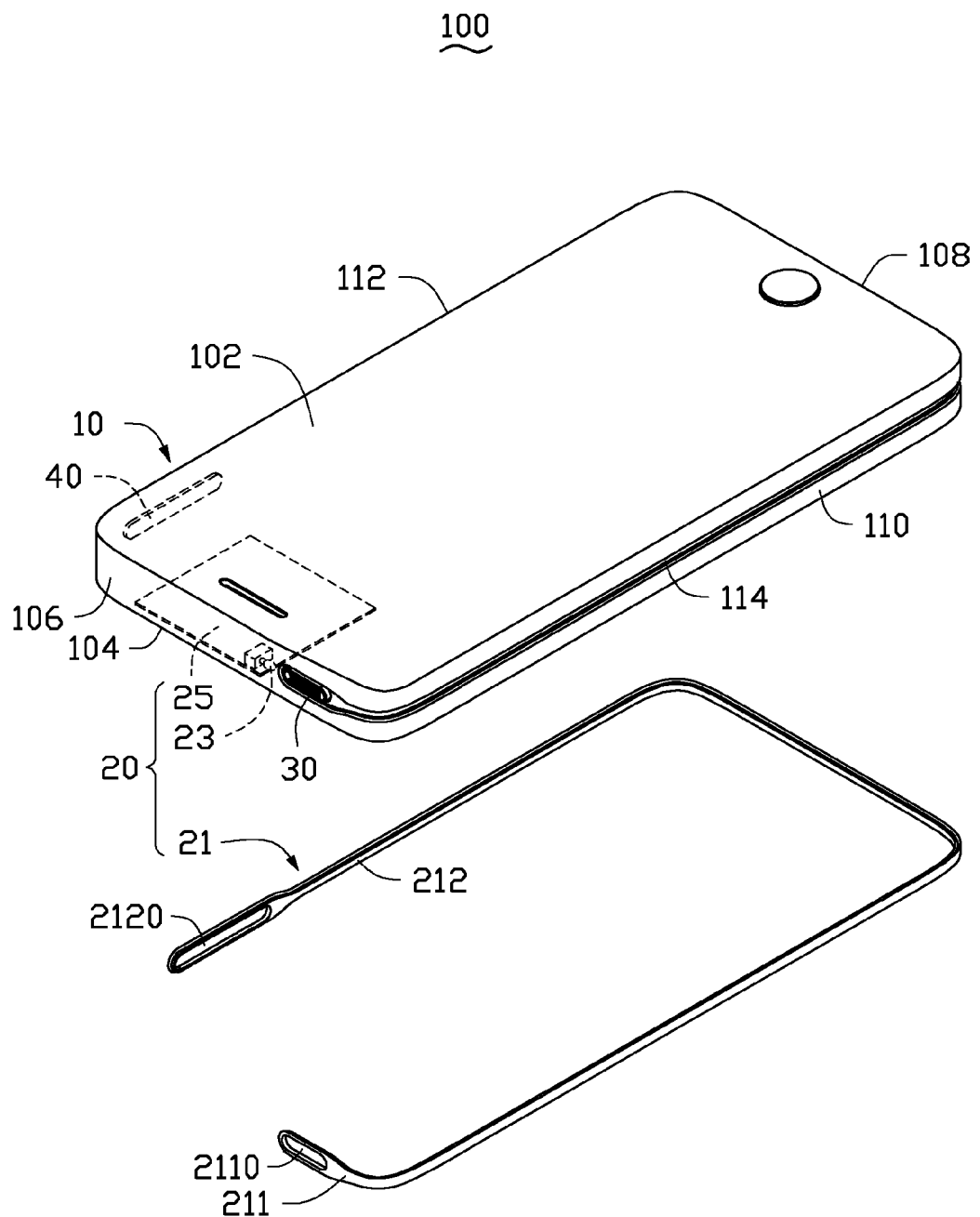
FIG. 1 is an exploded view of a portable electronic device with an illuminating module, according to an exemplary embodiment.

FIG. 1 illustrates an exemplary embodiment of a portable electronic device 100, such as a mobile phone, a personal digital assistant (PDA), or other electronic device. The portable electronic device 100 includes a body 10 and an illuminating module 20. The illuminating module 20 is positioned on the body 10 for illumination.

The body 10 includes a first surface 102, a second surface 104 opposite to the first surface 102, two opposite first sidewalls 106, 108 and two opposite second sidewalls 110, 112 substantially perpendicularly connected to the first and second surfaces 102, 104. A strip receiving groove 114 is defined in the first sidewall 108 and respectively extends along the second sidewalls 110, 112. A distal end of the receiving groove 114 extends from the second sidewall 110 to the first sidewall 106.

The portable electronic device 100 further includes one or more operating buttons, for example, a power button 30 and a volume button 40. In this embodiment, the power button 30 is positioned on the first sidewall 106 and is adjacent to one end of the receiving groove 114. The volume button 40 is positioned on the second sidewall 112 and is adjacent to the other end of the receiving groove 114. However, the buttons may be positioned adjacent or next to each other.

The illuminating module 20 includes a light guiding strip 21, a light source 23, and a control circuit 25.

The light guiding strip 21 is used for guiding light emitted by the light source 23 around the body 10. The light guiding strip 21 corresponds with the receiving groove 114 in shape and size, and is positioned in the receiving groove 114. The light guiding strip 21 is made of elastic material, such as plastic fiber, and thus can be bent to adapt a shape and a size of the receiving groove 114. The light guiding strip 21 includes a first end 211 and a second end 212. The first end 211 defines a first hole 2110, and the second end 212 defines a second hole 2120. The power button 30 and the volume button 40 can extend through the first and second holes 2110, 2120, respectively. Thus the light guiding strip 21 can be mounted in the receiving groove 114 through the power button 30 and the volume button 40.

The light source 23 may be a light-emitting diode (LED), or a lamp, for example. The light source 23 is mounted inside of the body 10, and faces the first end 211 of the light guiding strip 21 to illuminate the light guiding strip 21.

The control circuit 25 is secured within the body 10 and electronically connected to the light source 23. The control circuit 25 is used to control the light source 23 to irradiate light. The control circuit 25 includes a trigger button. The trigger button is positioned on the body 10. The trigger button can be a separate button (not shown) or can be integrated with operating buttons of the portable electronic device 100, for example, the power button 30 or the volume button 40. When the trigger button is activated (i.e., be pressed), a trigger signal is generated and transmitted to the control circuit 25. The control circuit 25 is activated to control the light source 23 to irradiate light.

In this embodiment, the trigger button is integrated with the power button 30 to turn on/off the light source 23. The control circuit 25 further includes a determining module (not shown) for determining modes of the power button 30. In detail, when the power button 30 is pressed, a trigger signal is generated and transmitted to the determining module of the control circuit 25. Then, the determining module of the control circuit 25 determines whether the trigger signal is used to control the light source 23 to irradiate light or activate the power button 30 to execute typical functions. When the determining module of the control circuit 25 determines the trigger signal is used to the control the light source 23 to irradiate light (e.g., a quick or incomplete pressing of the power button 30), the control circuit 25 controls the light source 23 to irradiate light. When the determining module of the control circuit 25 determines the trigger signal is used to activate the power button 30 (e.g., a long or complete pressing of the power button 30), the power button 30 will be activated by the control circuit 25 to execute typical functions, such as power on/off the portable electronic device 100.

Figure 2:
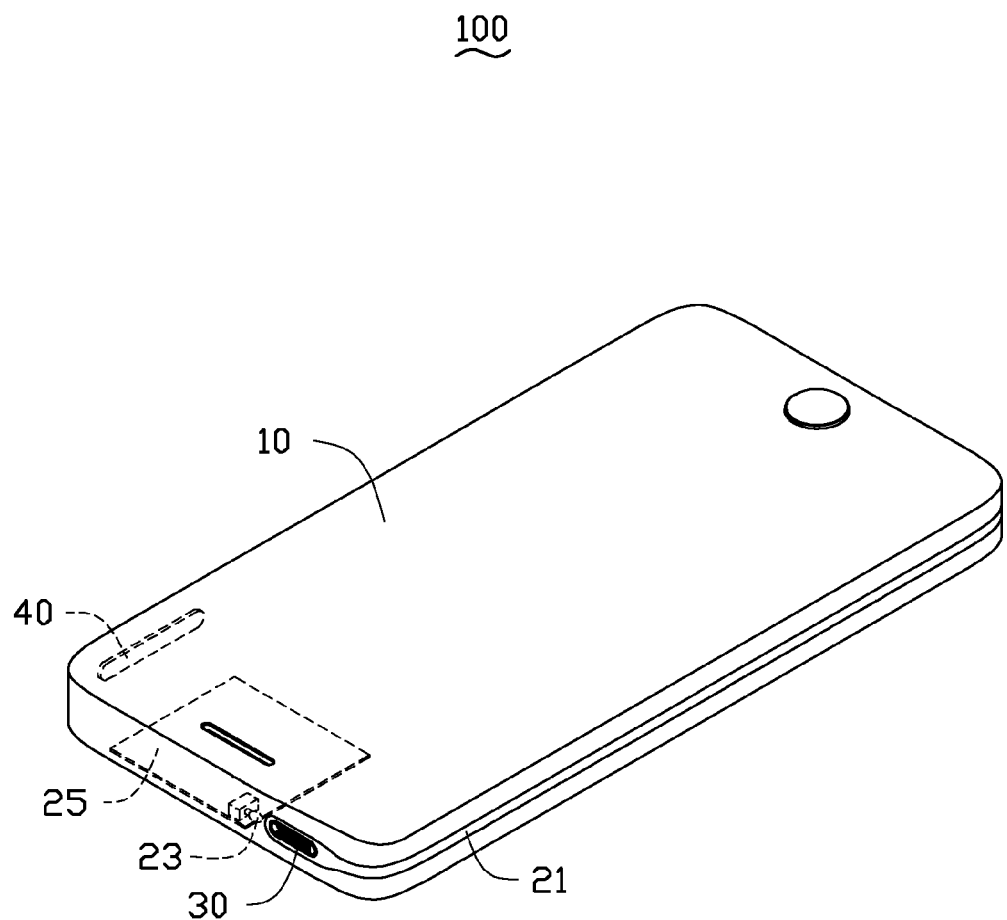
FIG. 2 is an assembled view of the portable electronic device shown in FIG. 1.

Referring to FIG. 2, in assembly of the portable electronic device 100, the light guiding strip 21 at least partially surrounds the body 10. The first end 211 and the second end 212 of the light guiding strip 21 are aligned with the power button 30 and the volume button 40. Then, the power button 30 and the volume button 40 extend through the first and second holes 2110, 2120, respectively, thereby the light guiding strip 21 is mounted in the receiving groove 114. When the power button 30 is pressed to generate a trigger signal, the control circuit 25 receives the trigger signal. The control circuit 25 is activated to work and the determining module of the control circuit 25 determines the trigger signal is used to control the light source 23 to irradiate light or activate the power button 30 to execute typical functions. When the determining module of the control circuit 25 determines the trigger signal is used to the control the light source 23 to irradiate light, the control circuit 25 controls the light source 23 to irradiate light. The irradiated light from the light source 23 is received by the light guiding strip 21 and will be evenly transported by the light guiding strip 21. In this way, the entire light guiding strip 21 is lit, and thus the side surface of the portable electronic device 100 will have a good lighting effect.

Correspondingly, when the determining module of the control circuit 25 determines the trigger signal is used to activate the power button 30 to execute typical functions, the power button 30 is activated by the control circuit 25 to execute functions of powering on/off the portable electronic device 100.

It is notable that the number of light source 23 is not limited to one, further the light source 23 may be LEDs with different colors and generates multiple colors to enhance an utility of the portable electronic device 100.

Understandably, both ends of the light guiding strip 21 may be adjacent to the light source 23, thereby both ends of the light guiding strip 21 being lit by the light source 23 and enhancing the lighting function of the portable electronic device 100.

Accordingly, the illuminating module 20 and the portable electronic device 100 include a light guiding strip 21 which can transport light from the light source 23 evenly, thereby making the portable electronic device 100 having a good lighting effect. Furthermore, the light guiding strip 21 can be bent for forming multiple shapes or patterns, thereby adapting to and decorating different portable electronic devices.

In the present specification and claims, the word "a" or "an" preceding an element does not exclude the presence of a plurality of such elements. Further, the word "comprising" does not exclude the presence of elements or steps other than those listed.

It is to be also understood that even though numerous characteristics and advantages of exemplary embodiments have been set forth in the foregoing description, together with details of the structures and functions of the embodiments, the disclosure is illustrative only, and changes may be made in detail, especially in matters of arrangement of parts within the principles of this disclosure to the full extent indicated by the broad general meaning of the terms in which the appended claims are expressed.

What is claimed is:

1. An illuminating module attached to a body of a portable electronic device, comprising:
    a light source mounted in the body;
    a control circuit connected to the light source and comprising a trigger button integrated with a power button or a volume button of the portable electronic device, when the trigger button is pressed, a trigger signal is generated, the control circuit is activated to work and controls the light source to irradiate light; and
    a light guiding strip at least partially surrounding the body and at least one end of the light guiding strip facing the light source;
    wherein the light source irradiates light, and the light guiding strip receives and guides the light around the body.

2. The illuminating module of claim 1, wherein the light source is a light-emitting diode.

3. The illuminating module of claim 1, wherein the light source is a lamp.

4. The illuminating module of claim 1, wherein the light guiding strip is made of elastic material.

5. A portable electronic device comprising:
    a body defining a receiving groove;
    a power button positioned in the receiving groove;
    a volume button positioned in the receiving groove;
    an illuminating module comprising:
        a light source mounted inside of the body;
        a control circuit connected to the light source and controlling the light source to irradiate light; and
        a light guiding strip received in the receiving groove through the power button and the volume button and at least one end of the light guiding strip facing the light source;
        wherein the light source irradiates light, and the light guiding strip receives and guides the irradiated light around the body.

6. The portable electronic device of claim 5, wherein the light source is a light-emitting diode.

7. The portable electronic device of claim 5, wherein the light source is a lamp.

8. The portable electronic device of claim 5, wherein the light guiding strip is made of elastic material.

9. The portable electronic device of claim 5, wherein the body comprises a first surface, a second surface opposite to the first surface, two opposite first sidewalls and two opposite second sidewalls perpendicularly connected to the first and second surfaces, the receiving groove is defined in one of the first sidewall and extends along the two second sidewalls, a distal end of the receiving groove extends from one of the second sidewall to the other first sidewall.

10. The portable electronic device of claim 5, wherein the light guiding strip comprises a first end and a second end, the first end defines a first hole and the second end defines a second hole, the power button and the volume button respectively extend through the first and second holes.

11. The portable electronic device of claim 5, wherein the power button or the volume button is connected to the control circuit, when the power button or the volume button is pressed, a trigger signal is generated and output to the control circuit, the control circuit is activated to work and determines the trigger signal is used to control the light source to irradiate light or activate the power button or the volume button to execute functions.

12. The portable electronic device of claim 11, wherein when the control circuit determines the trigger signal is used to the control the light source to irradiate light, the control circuit controls the light source to irradiate light.

13. The portable electronic device of claim 11, wherein when the control circuit determines the trigger signal is used to activate the power button or the volume button, the power button or the volume button is activated by the control circuit to execute functions.

14. A portable electronic device comprising:
    a body defining a receiving groove;
    a power button;
    a volume button; and
    an illuminating module comprising:
        a light source mounted inside of the body;
        a control circuit connected to the light source and comprising a trigger button integrated with the power button or the volume button, when the trigger button is pressed, a trigger signal is generated, the control circuit is activated to work and controls the light source to irradiate light; and
        a light guiding strip received in the receiving groove and at least one end of the light guiding strip facing the light source;
        wherein the light source irradiates light, and the light guiding strip receives and guides the irradiated light around the body.

15. The portable electronic device of claim 14, wherein the power button and the volume button are positioned in the receiving groove to fix the light guiding strip.

16. The portable electronic device of claim 15, wherein the light guiding strip comprises a first end and a second end, the first end defines a first hole and the second end defines a second hole, the power button and the volume button respectively extend through the first and second holes.

17. The portable electronic device of claim 14, wherein when the trigger button is pressed, the control circuit further determines the trigger signal is used to control the light source to irradiate light or activate the power button or the volume button to execute functions.

18. The portable electronic device of claim 17, wherein when the control circuit determines the trigger signal is used to the control the light source to irradiate light, the control circuit controls the light source to irradiate light.

19. The portable electronic device of claim 17, wherein when the control circuit determines the trigger signal is used to activate the power button or the volume button, the power button or the volume button is activated by the control circuit to execute functions.

* * * * *